United States Patent [19]

Mita et al.

[11] Patent Number: 4,953,179
[45] Date of Patent: Aug. 28, 1990

[54] ENERGY-DISPERSAL SIGNAL REJECTION CIRCUIT AND METHOD

[75] Inventors: Hiroyuki Mita; Kozo Kobayashi, both of Kanagawa, Japan

[73] Assignee: Sony Corporation, Tokyo, Japan

[21] Appl. No.: 192,687

[22] Filed: May 10, 1988

[30] Foreign Application Priority Data

May 23, 1987 [JP] Japan .................... 126545

[51] Int. Cl.⁵ .................. H04K 1/00; H04N 5/18
[52] U.S. Cl. ........................... 375/1; 358/172
[58] Field of Search ............ 380/9, 10, 7; 375/1; 358/172

[56] References Cited

U.S. PATENT DOCUMENTS

| | | | |
|---|---|---|---|
| 4,074,311 | 2/1978 | Tanner et al. | 380/10 |
| 4,222,066 | 9/1980 | Zelenz | 380/10 |
| 4,455,651 | 6/1984 | Baran | 375/1 |
| 4,475,214 | 4/1984 | Gutleber . | |
| 4,535,355 | 8/1985 | Arn et al. | 380/10 |
| 4,544,951 | 10/1985 | Yoshisato | 358/172 |
| 4,584,712 | 2/1986 | Isobe et al. . | |
| 4,688,246 | 8/1987 | Ellers et al. | 380/10 |
| 4,725,882 | 2/1988 | Sato et al. | 380/10 |
| 4,790,009 | 12/1988 | Ishigaki et al. | 380/10 |

FOREIGN PATENT DOCUMENTS

| | | |
|---|---|---|
| A20187672 | 7/1986 | European Pat. Off. . |
| A20228786 | 7/1987 | European Pat. Off. . |
| 988677 | 4/1965 | United Kingdom . |
| 1381903 | 1/1975 | United Kingdom . |
| A2174575 | 11/1986 | United Kingdom . |
| A2174576 | 11/1986 | United Kingdom . |

Primary Examiner—Salvatore Cangialosi
Attorney, Agent, or Firm—Alvin Sinderbrand Curtis, Morris & Safford

[57] ABSTRACT

An energy-dispersal signal rejection circuit adapted for use in a direct-broadcast-from-satellite system rejects an energy-dispersal signal from an input signal which includes a video signal composed with the energy-dispersal signal by generating a cancellation signal synchronized with, and having a phase and amplitude determined in accordance with the energy-dispersal signal, and such cancellation signal is composed with the input signal, for example by adding the two signals, so that the energy-dispersal signal is cancelled from the input signal and the video signal is produced as an output signal.

16 Claims, 3 Drawing Sheets

FIG.2
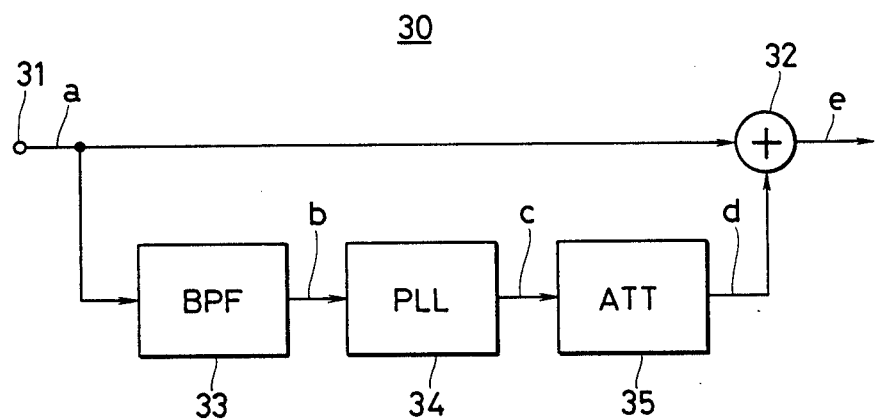
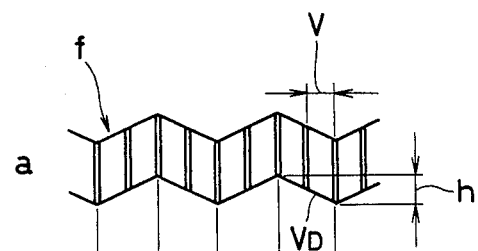
FIG.3A  a
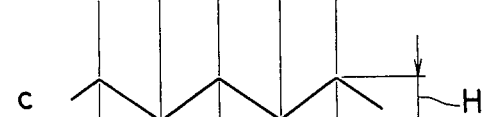
FIG.3B  b
FIG.3C  c
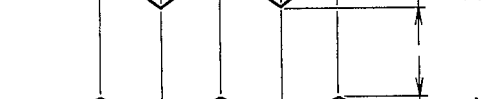
FIG.3D  d
FIG.3E  e

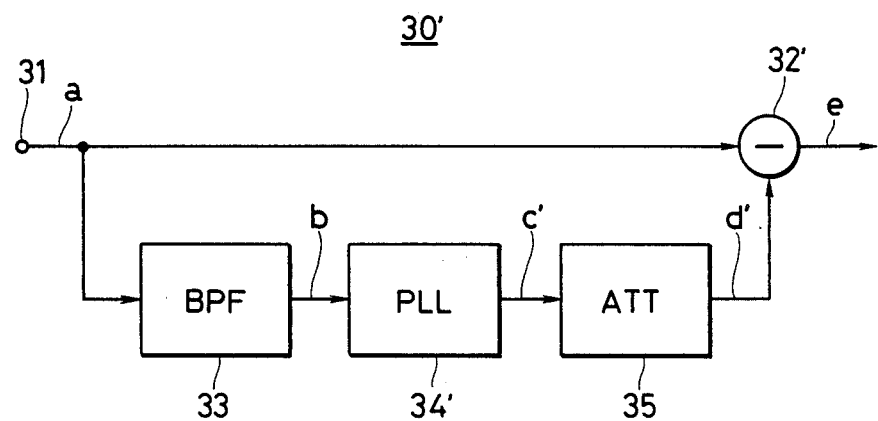

ENERGY-DISPERSAL SIGNAL REJECTION CIRCUIT AND METHOD

FIELD OF THE INVENTION

The present invention relates to direct-broadcast-from-satellite systems and in particular is directed to an energy-dispersal signal rejection circuit adapted for use in such systems.

BACKGROUND OF THE INVENTION

In direct-broadcast-from-satellite (DBS) systems, a frequency-modulated information signal, which is generally a video signal, is transmitted on a carrier at super high frequencies (SHF) from a satellite to a large number of DBS receivers on the ground. In order to avoid interference with signals being transmitted by ground-based systems, the video signal may be composed with an energy-dispersal signal before frequency modulation. The energy-dispersal signal has a triangular waveform synchronized with the video signal, for example at the frame rate, and the resultant composed signal, when frequency modulated and transmitted on a carrier, may be effectively transmitted without disturbing ground-based transmission systems.

The energy-dispersal signal must then be rejected from the received signal at the DBS receiver. It has been found that in order to obtain a good video picture, the energy-dispersal signal rejection ratio must be at least 50 dB. The result of partial rejection (low rejection ratio) of the energy-dispersal signal is a sag at the vertical rate in the video signal. One way to reject the energy-dispersal signal is to supply the demodulated signal to a peak-clamp circuit or a pulse clamp circuit, such as are used to fix the peak level of the video synchronizing signals. In order to achieve the desired rejection ratio of at least 50 dB, the time constant of the clamp circuit must be short, since the use of a clamp circuit with a relatively long time constant results in only partial rejection of the energy-dispersal signal.

In practical terms, peak clamp circuits with short time constants are difficult to realize. As an alternative, pulse clamp circuits with short time constants are more easily realizable, and therefore the desirably large rejection ratio is achievable thereby. However, pulse clamp circuits with short time constants are subject to misclamping caused by noise generated in the frequency demodulator, particularly when the carrier-to-noise ratio (C/N) is bad. The result is that horizontal line-shaped noise appears in the picture and the quality of the picture is severely degraded. Therefore, these prior art methods for rejecting the energy-dispersal signal are ineffective to provide both a high rejection ratio and good picture quality.

It has been proposed, by persons having an obligation to assign to the assignee of the present application, to provide a clamp circuit whose time constant is selectively made longer when the C/N ratio is low. This proposal is described in Japanese Patent Application No. 61-201139, assigned to the present assignee. By using this technique, misclamping is avoided, but a high rejection ratio is still unobtainable when the C/N ratio is low.

OBJECTS AND SUMMARY OF THE INVENTION

It is therefore an object of the present invention to provide an energy-dispersal signal rejection circuit which avoids the above-described difficulties of the prior art.

It is another object of the present invention to provide an energy-dispersal signal rejection circuit which provides a high rejection ratio independent of the carrier-to-noise ratio.

It is still another object of the present invention to provide an energy-dispersal signal rejection circuit which may be combined with a peak clamp circuit or pulse clamp circuit to provide sure and effective rejection of the energy-dispersal signal.

In accordance with an aspect of the present invention, an energy-dispersal signal rejection circuit comprises an input receiving an input signal including an information signal composed with an energy-dispersal signal, cancellation signal generating means for generating a cancellation signal synchronized with, and having a phase and amplitude determined in accordance with the energy-dispersal signal, and cancellation means for composing the cancellation signal with the input signal so as to cancel the energy-dispersal signal and produce the information signal as an output signal.

Advantageously, this energy-dispersal signal rejection circuit may be incorporated in an apparatus for deriving an information signal from a direct-broadcast-from-satellite signal including an FM modulated input signal composed of the information signal and an energy-dispersal signal, the apparatus further comprising receiver means for receiving the direct-broadcast-from satellite signal and providing the FM modulated input signal therefrom, and FM demodulator means for demodulating the FM modulated input signal and providing the input signal to the energy-dispersal signal rejection circuit.

In accordance with another aspect of the present invention, a method for rejecting an energy-dispersal signal having a predetermined frequency from an input signal which includes an information signal composed with the energy-dispersal signal comprises the steps of filtering the input signal so as to provide a filtered signal within a limited range of frequencies including the predetermined frequency, generating a synchronized signal synchronized with the energy-dispersal signal in response to the filtered signal, attenuating an amplitude of the synchronized signal in accordance with a corresponding amplitude of the energy-dispersal signal to provide a cancellation signal, and composing the cancellation signal with the input signal so as to provide the information signal.

The above, and other objects, features and advantages of the present invention, will become clear from the following detailed description of preferred embodiments thereof to be read in connection with the accompanying drawings, in which the same reference numerals designate like elements and parts in the several views.

BRIEF DESCRIPTION OF THE DRAWINGS

FIG. 2 is a block diagram showing further details of the energy-dispersal signal rejection circuit included in the system of FIG. 1 in accordance with a first embodiment of the present invention;

FIGS. 3A through 3E are waveform diagrams showing respective signals occurring at various locations in the circuit of FIG. 2, and to which reference will be made in explaining the operation thereof; and FIG. 4 is a block diagram similar to that of FIG. 2, but showing an energy-dispersal signal rejection circuit in accordance with another embodiment of the present invention.

DETAILED DESCRIPTION OF THE PREFERRED EMBODIMENTS

Figure 1:
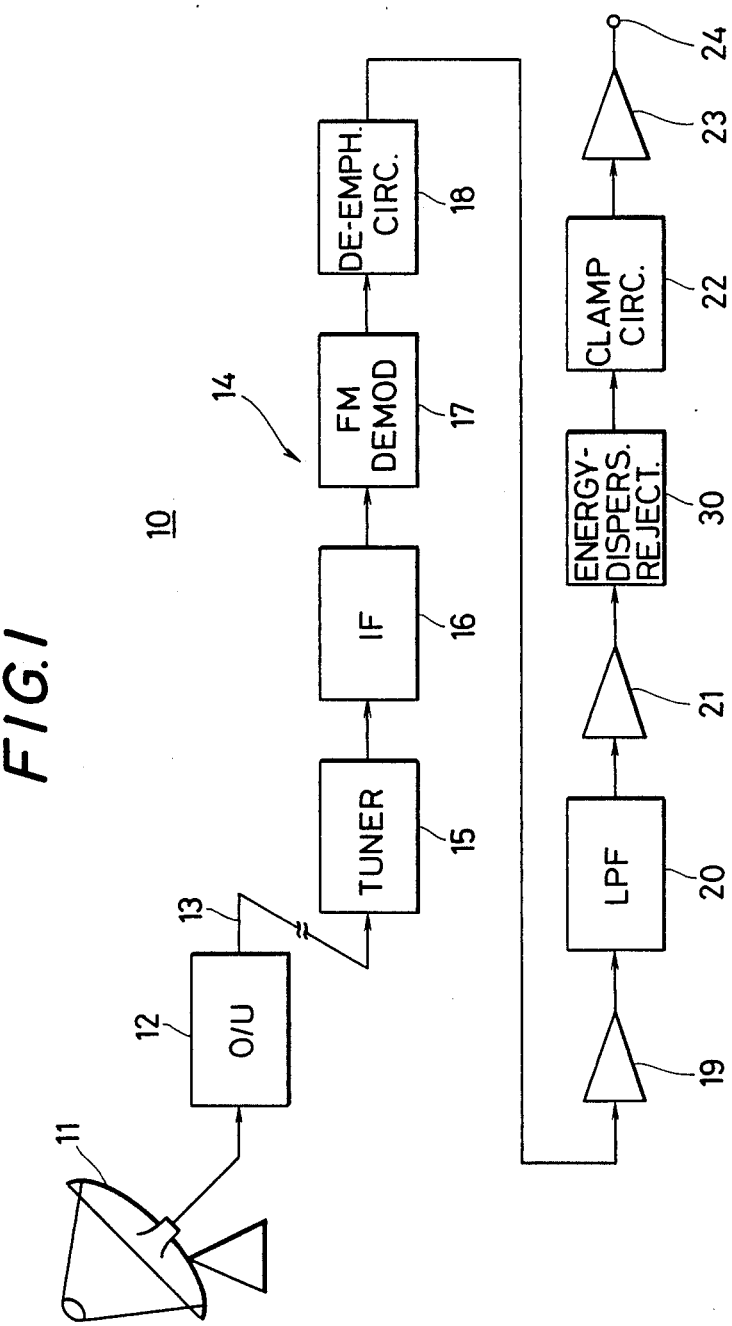
FIG. 1 is a block diagram of a direct-broadcast-from-satellite system incorporating an energy-dispersal signal rejection circuit in accordance with the present invention.

Referring to the drawings in detail, and initially to FIG. 1 thereof, it will be seen that, a direct-broadcast-from-satellite (DBS) receiver 10 which may advantageously be provided with an energy-dispersal signal rejection circuit 30 in accordance with the present invention includes a parabolic antenna 11 for receiving a broadcast superhigh frequency (SHF) signal from a satellite. The broadcast SHF signal includes an FM modulated input signal composed of an information signal and an energy-dispersal signal. In the example being described, the information signal is a video signal, and the present invention is directed generally towards the extraction of this video signal from the SHF signal free of the energy-dispersal signal.

The SHF signal at the output of antenna 11 is converted by a so-called outdoor unit 12 to a first intermediate frequency signal, for example, a UHF signal at about 1 GHz (gigahertz). The signal from outdoor unit 12 is supplied through a coaxial cable 13 to an indoor unit 14 which includes the remaining elements for extracting the video signal from the broadcast SHF signal.

More particularly, the coaxial cable 13 is directly connected to a tuner 15 at the input of indoor unit 14. Tuner 15 produces a second intermediate frequency signal containing a signal at a particular frequency selected by a user, for example, a desired UHF station signal. This second intermediate frequency signal is an FM modulated input signal and is supplied to an intermediate frequency amplifier 16. The amplified signal output from amplifier 16 is supplied to an FM demodulator 17 which produces a demodulated input signal. This demodulated input signal is fed through a deemphasis circuit 18, corresponding to an emphasis circuit at the transmission side (not illustrated), to an amplifier 19. The output of amplifier 19 is limited to a defined frequency range, for example, less than 4.5 MHz, by a low pass filter 20. The output of low pass filter 20 is supplied through an amplifier 21 to an energy-dispersal signal rejection circuit 30 in accordance with the present invention. As hereinafter described in detail, the output of energy-dispersal signal rejection circuit 30 is the video signal from which the energy-dispersal signal has been rejected, and is advantageously supplied through a clamp circuit 22 and an output amplifier 23 to an output terminal 24.

Turning now to FIG. 2, it will be seen that the energy-dispersal signal rejection circuit 30 in accordance with a first embodiment of the present invention includes an input terminal 31 at which the demodulated input signal a is received from amplifier 21 in FIG. 1. Input terminal 31 is connected directly to a first input of a cancellation circuit 32 which, in this embodiment, is constituted by an adder. Input terminal 31 is also connected to a band pass filter 33. A signal b output from band pass filter 33 is fed to a phase-locked-loop (PLL) circuit 34. A PLL signal c output from PLL circuit 34 is fed to an attenuator 35, and the resulting attenuated signal d is fed from attenuator 35 to a second input of the adder 32. The summation signal e output from adder 32 is the video signal f, which is derived in the following manner.

FIGS. 3A–3E illustrate the signals a-e, respectively, identified above in respect to FIG. 2. Referring first to FIG. 3A, the demodulated input signal a received at input terminal 31 is shown to be composed of a video signal f and an energy-dispersal signal $V_D$ which is used to disperse the energy of the broadcast signal. Energy-dispersal signal $V_D$ has a triangular waveform synchronized with a vertical scanning or synchronizing signal of video signal f. Thus, in a case employing the NTSC format, the energy-dispersal signal $V_D$ may correspond to a low frequency signal of 15 or 30 Hz.

In the example illustrated in FIG. 3A, energy-dispersal signal $V_D$ has a frequency of 15 Hz, so that two frames, each consisting of two fields, of video signal f occur in each cycle of the energy-dispersal signal $V_D$. Energy-dispersal signal $V_D$ further has a peak-to-peak amplitude h, and the peaks of triangular energy-dispersal signal $V_D$ are synchronized with the positions of vertical synchronizing signals of the video signal f occurring between adjacent frames or fields. Each field has a vertical period V which, in the NTSC system, is 1/60 sec.

In this particular example with the frequency of energy-dispersal signal $V_D$ being 15 Hz, the pass frequency of band pass filter 33 is also selected to be 15 Hz. Of course, if the frequency of energy-dispersal signal $V_D$ were 30 Hz, the pass frequency of band pass filter 33 would be 30 Hz. Band pass filter 33 generally selects the energy-dispersal signal $V_D$ from the demodulated input signal a and outputs the generally sinusoidal signal b having the frequency 15 Hz, as illustrated in FIG. 3B.

Signal b from band pass filter 33 is supplied to PLL circuit 34, which is designed so as to output a triangular wave PLL signal c, as illustrated in FIG. 3C. In this first preferred embodiment, signal c has the same frequency as signal b and is 180° out of phase therewith. Further, signal c has a peak-to-peak magnitude H.

Signal c from PLL circuit 34 is fed to attenuator 35, which outputs signal d, illustrated in FIG. 3D. Attenuator 35 adjusts the peak-to-peak magnitude H of signal c so that signal d has the same peak-to-peak magnitude H as energy-dispersal signal $V_D$. To this end, attenuator 35 may be designed to automatically detect the peak-to-peak magnitude H of signal c and to automatically match it to the peak-to-peak magnitude h. Alternatively, an operator may manually adjust the attenuation factor of attenuator 35 through a suitable control element or the like. When energy-dispersal signal rejection circuit 30 is incorporated in the DBS system 10 illustrated in FIG. 1, a conventional amplitude limiter included in FM demodulator 17 will result in the magnitude h of the energy-dispersal component of signal a being fixed. It is then relatively easy for attenuator 35 to perform its function automatically, as the amplitude H of the signal c can be readily adjusted to correspond to the fixed amplitude h.

Signal d from attenuator 35 acts as a cancellation signal when supplied to adder 32. When adder 32 composes the input signal a with the cancellation signal d by adding the two, the resultant output signal e is the video signal f, as illustrated in FIG. 3E. Band pass filter 33, PLL circuit 34 and attenuator 35 may therefore be considered a cancellation signal generator for generating the cancellation signal d which is synchronized with, and has its phase and amplitude determined in accordance with the energy-dispersal signal $V_D$. Therefore, adder 32 operates as a cancellation circuit, which in composing the cancellation signal d with the input signal a, cancels the energy-dispersal signal $V_D$ and produces the video signal f as an output signal.

It is intended that cancellation signal d correspond completely with energy-dispersal signal $V_D$ in synchronization, amplitude and phase, as discussed above. If there is such complete correspondence, energy-dispersal signal $V_D$ is completely rejected by energy-dispersal signal rejection circuit 30 and no further rejection circuitry is required. Practically, however, the triangular wave of cancellation signal d may differ slightly from that of energy-dispersal signal $V_D$, for example in its phase or amplitude, or it may be slightly nonlinear. In such a case, the rejection of energy-dispersal signal $V_D$ may be incomplete. However, even such incomplete rejection greatly reduces the contribution of energy-dispersal signal $V_D$ to the composed signal e, and it is relatively easy to reject any remainder of energy-dispersal signal $V_D$ by means of a conventional clamp circuit 22, as illustrated in FIG. 1. Since most of energy-dispersal signal $V_D$ has already been rejected by energy-dispersal signal rejection circuit 30 before the output signal e therefrom is fed to clamp circuit 22, the time constant of clamp circuit 22 may be relatively long. Peak clamp circuits with long time constants are easy to construct. Alternatively, clamp circuit 22 may be a pulse clamp circuit, which may now be used without risk of producing the horizontal line-shaped noises caused in the prior art by misclamping when the carrier-to-noise ratio C/N is low.

It will be appreciated from the above that, in accordance with the present invention, a high rejection ratio of the energy-dispersal signal $V_D$ is achieved by generating a cancellation signal d having a wave-shape corresponding to that of energy-dispersal signal $V_D$ and a magnitude substantially equal to the corresponding magnitude of energy-dispersal signal $V_D$, but having a phase inverted with respect to a corresponding phase of energy-dispersal signal $V_D$. Energy-dispersal signal rejection circuit 30 operates stably without the interference of noise which might occur in the prior art pulse clamp circuits because it rejects the energy-dispersal signal $V_D$ by composition with, more specifically, addition to, the cancellation signal d. Accordingly, it is possible to obtain the desirably high rejection ratio regardless of the carrier-to-noise ratio.

Furthermore, if energy-dispersal signal rejection circuit 30 is combined with clamp circuit 22, as illustrated in FIG. 1, the rejection ratio is further increased, even if cancellation signal d is generated with some inaccuracy.

In the embodiment of FIG. 2, signal c output from PLL circuit 34 is generated with its phase inverted in respect to the corresponding phase of energy-dispersal signal $V_D$ so that the adder 32 may act as a cancellation circuit. FIG. 4 illustrates an energy-dispersal signal rejection circuit 30' according to another embodiment of the invention and in which input terminal 31, band pass filter 33 and attenuator 34 are identical to the correspondingly numbered elements in FIG. 2. However, in the circuit 30', cancellation circuit 32' is constituted by a subtractor, rather than an adder, and PLL circuit 34' produces an output signal c' having the same peak-to-peak magnitude H as signal c but 180° out of phase therewith. In other words, signal c' is in phase with energy-dispersal signal $V_D$. Thus, signal d' output from attenuator 35 will have been adjusted to have the same magnitude h as the energy-dispersal component of signal a and will be in phase therewith. When cancellation signal d' is now composed with input signal a by subtraction, the resultant output signal e from subtractor 32' is identical to signal e illustrated in FIG. 3E, that is, it consists of the video signal f.

By way of summary, it will be seen that, in accordance with the present invention, the energy-dispersal signal $V_D$ is rejected from the demodulated input signal with a high rejection ratio. This is achieved by generating a cancellation signal which is synchronized with and has an amplitude and phase determined in accordance with the input signal and by composing the cancellation signal with the input signal. This results in both a high-rejection ratio and a stable operation, because in accordance with the present invention the magnitude of any remaining component of the energy-dispersal signal in the signal supplied to a following clamp circuit is very low, reducing the risk of misoperation caused by noise when the carrier to noise ratio is low.

Although embodiments of the present invention have been described in detail herein with reference to the accompanying drawings, it will be apparent that the invention is not limited thereto, and that various changes and modifications may be effected therein by one skilled in the art without departing from the spirit and scope of the invention as defined in the appended claims.

What is claimed is:

1. An energy-dispersal signal rejection circuit, comprising:
    an input receiving a direct-broadcast-from satellite signal which includes a periodic information signal composed with an energy-dispersal signal having a triangular waveform synchronized to the period of the information signal;
    cancellation signal generating means for generating a cancellation signal synchronized with, and having a phase and amplitude determined in accordance with, said energy-dispersal signal, said cancellation signal generating means including band pass filter means receiving said direct-broadcast-from satellite signal and producing a filtered output signal, phase-locked-loop means receiving said filtered output signal and producing a phase-locked output signal, and attenuation means receiving said-phase-locked output signal; and
    cancellation means connected with said attenuation means for composing said cancellation signal from the latter with said direct-broadcast-from satellite signal so as to cancel said energy-dispersal signal and produce said information signal as an output signal.

2. An energy-dispersal signal rejection circuit according to claim 1; wherein said information signal is a video signal and said period corresponds to the period of a vertical synchronization signal.

3. An energy-dispersal signal rejection circuit according to claim 1; wherein said cancellation signal is generated with an amplitude substantially equal to a corresponding amplitude of said energy-dispersal signal, and with a phase substantially opposite to a corresponding phase of said energy-dispersal signal; and wherein said cancellation means includes adding means for adding said cancellation signal and said direct-broadcast-from satellite signal.

4. An energy-dispersal signal rejection circuit according to claim 1; wherein said cancellation signal is generated with an amplitude substantially equal to a corresponding amplitude substantially equal to a corresponding amplitude of said energy-dispersal signal, and with a phase substantially equal to a corresponding phase of said energy-dispersal signal; and wherein said cancellation means includes subtracter means for subtracting said cancellation signal from said direct-broadcast-from satellite signal.

5. An energydispersal signal rejection circuit according to claim 1; wherein said cancellation means is also directly connected to said input.

6. An energy-dispersal signal rejection circuit according to claim 1; further comprising clamp circuit means connected to receive said information signal from said cancellation means.

7. An energy-dispersal signal rejection circuit according to claim 6; wherein said clamp circuit means includes a peak clamp circuit.

8. An energy-dispersal signal rejection circuit according to claim 6; wherein said clamp circuit means includes a pulse clamp circuit.

9. Apparatus for deriving a periodic information signal from a direct-broadcast-from-satellite signal including an energy-dispersed information signal which is FM modulated, the energy-dispersed information signal being composed of said periodic information signal and an energy-dispersal signal, said energy-dispersal signal having a triangular waveform synchronized to the period of said information signal, said energy-dispersal signal dispersing the energy of said information signal according to said triangular waveform to avoid interference with signal transmitted by ground-based systems, said apparatus comprising:

receiver means for receiving said direct-broadcast-from-satellite signal and providing said FM modulated energy-dispersed information signal therefrom;

FM demodulator means for demodulating said FM modulated energy-dispersed information signal to provide said energy-dispersed information signal composed of said information signal and said energy-dispersal signal having a triangular waveform;

cancellation signal generating means receiving said energy-dispersed information signal for generating a cancellation signal synchronized with, and having a phase and amplitude determined in accordance with, said energy-dispersal signal contained in said energy-dispersed information signal, said cancellation signal generating means including bandpass filter means receiving said direct-broadcast-from-satellite signal and producing a filtered output signal, phase-locked-loop means receiving said filtered output signal and producing a phase-locked output signal, and attenuation means receiving said phase-locked output signal; and cancellation means connected with said attenuation means for composing said cancellation signal from the latter with said energy-dispersed information signal so as to cancel said energy-dispersal signal and produce said periodic information signal as an output signal.

10. Apparatus according to claim 9; wherein said periodic information signal is a video signal and said period corresponds to the period of a vertical synchronization signal.

11. A method for rejecting an energy-dispersal signal from a direct-broadcast-from-satellite signal which includes an information signal composed with said energy-dispersal signal, said energy-dispersal signal having a predetermined frequency, a period corresponding to the period of the information signal, and a triangular waveform synchronized to the period of the information signal said energy-dispersal signal dispersing the energy of said information signal according to said triangular waveform to avoid signal interference, said method comprising the steps of:

filtering said direct-broadcast-from-satellite signal through a bandpass filter so as to provide a filtered signal within a limited range of frequencies including said predetermined frequency;

applying said filtered signal to a phase-locked-loop in which a synchronized signal synchronized with said energy-dispersal signal is generated in response to said filtered signal, attenuating an amplitude of said synchronized signal in accordance with a corresponding amplitude of said energy-dispersal signal to provide a cancellation signal which substantially matches one of said triangular waveform of said energy-dispersal signal and a corresponding inverted waveform; and composing said cancellation signal with said input signal for canceling said energy-dispersal signal so as to provide said information signal.

12. A method according to claim 11; wherein said periodic information signal is a video signal and said period corresponds to the period of a vertical synchronization signal.

13. A method according to claim 11; wherein said amplitude of said cancellation signal is substantially equal to a corresponding amplitude of said energy-dispersed signal.

14. A method according to claim 13; wherein said synchronized signal is generated with a phase substantially opposite to a corresponding phase of said energy-dispersal signal; and wherein said composing is effected by adding said cancellation signal and said direct-broadcast-from satellite signal.

15. A method according to claim 13; wherein said synchronized signal is generated with a phase substantially equal to a corresponding phase of said energy-dispersal signal; and wherein said composing is effected by subtracting said cancellation signal from said direct-broadcast-from satellite signal.

16. A method according to claim 11; further comprising a final step of clamping said information signal.

* * * * *